June 10, 1941.   G. E. AULENBACHER ET AL   2,245,248
PRETIMER FOR SHUTTERS
Filed June 12, 1940
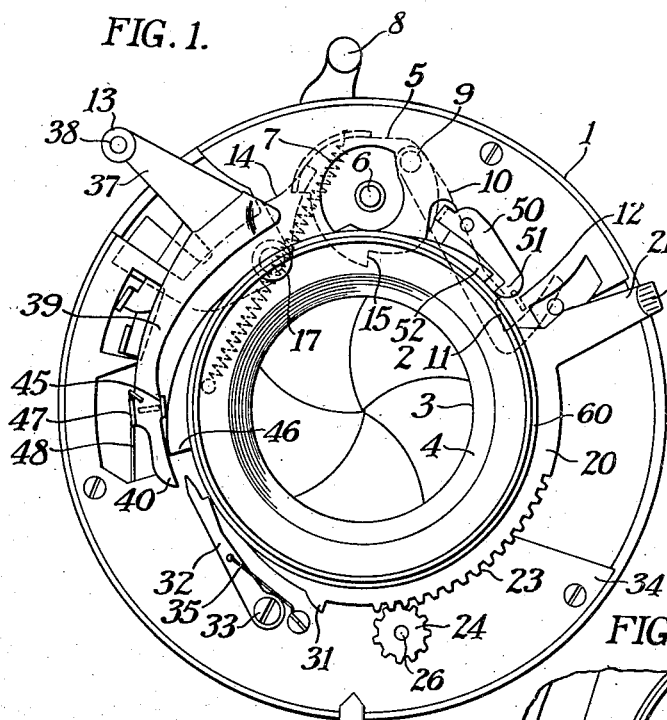
FIG. 1.
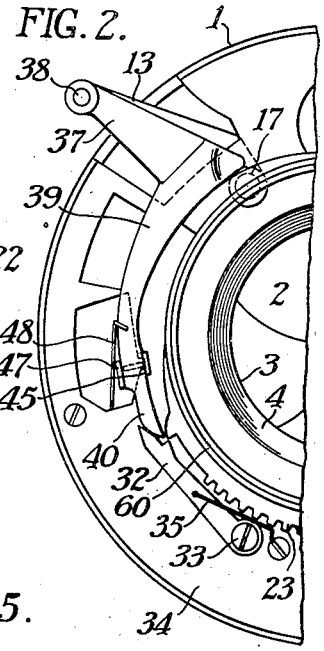
FIG. 2.
FIG. 5.
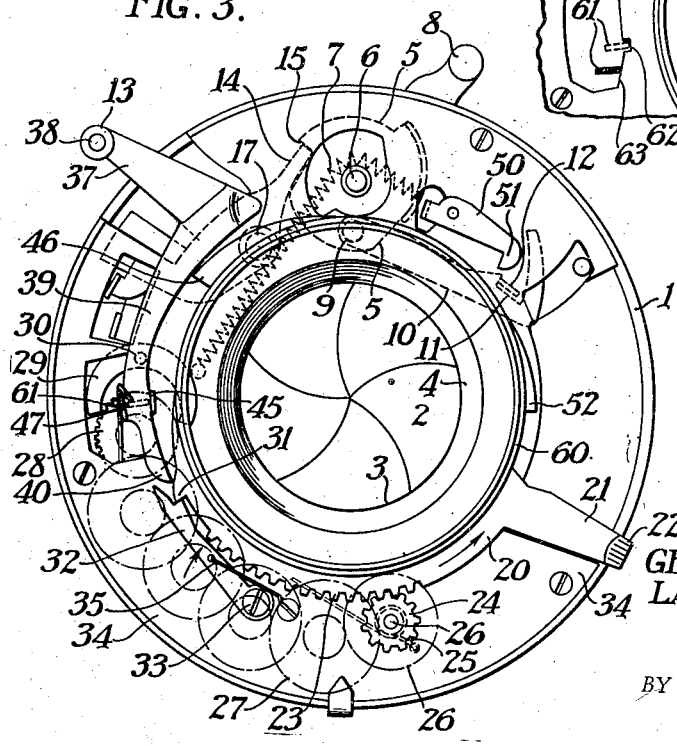
FIG. 3.
FIG. 4.
GEORGE E. AULENBACHER
LAWRENCE R. MARTIN
INVENTORS
BY
ATTORNEYS Patented June 10, 1941

2,245,248

UNITED STATES PATENT OFFICE 2,245,248

PRETIMER FOR SHUTTERS

George E. Aulenbacher and Lawrence R. Martin, Rochester, N. Y., assignors to Eastman Kodak Company, Rochester, N. Y., a corporation of New Jersey Application June 12, 1940, Serial No. 340,150

6 Claims. (Cl. 161—26)

This invention relates to photography and more particularly to pretimers for photographic shutters.

One object of our invention is to provide a shutter with a pretiming mechanism which will cause the shutter to make an exposure after a predetermined elapsed time, permitting the operator to get into the picture. Another object of our invention is to provide a pretimer which may be applied to shutters of the setting type or shutters of the automatic type, the pretimer in each instance being adapted to move the shutter trigger to make an exposure in the usual manner. Still another object of our invention is to provide a latch mechanism adapted to retain the pretimer in a set position and to be released by an initial operation of the trigger, which is insufficient to make an exposure but which is sufficient to start the movement of the self-timer, after which the self-timer may in turn move the trigger a distance sufficient to trip the shutter mechanism. Still another object of our invention is to provide a latch mechanism for releasing the pretimer, which normally lies in an inoperative position with respect to the trigger but which is moved into an operative position by means of setting the pretimer, and other objects will appear from the following specification, the novel features being particularly pointed out in the claims at the end thereof.

Coming now to the drawing wherein like reference characters denote like parts throughout:

Fig. 1 is a front elevation of a shutter provided with a pretimer embodying a preferred form of our invention, the shutter cover plate having been removed.

Fig. 2 is a fragmentary view similar to parts of Fig. 1, but with the shutter trigger in its tripping position.

Fig. 3 is a view similar to the preceding figures, but with the pretimer in position to be released by the shutter trigger.

Fig. 4 is a view similar to Fig. 2, but showing the trigger drawn down into a shutter releasing position by means of the pretiming mechanism.

Fig. 5 is a fragmentary detail of a portion of the shutter showing the shutter lever guide.

This application is for an improvement over the photographic shutter with built-in shutter actuator shown in U. S. Patent No. 2,090,070, William A. Riddell, granted August 17, 1937. Many of the parts are very similar to the parts shown in this patent, although the releasing mechanism is entirely different. In our structure, the pretimer can be latched in an operative position, in which it may be released by the trigger only when the pretimer setting lever has been fully set.

In our present embodiment, the shutter casing 1 may be provided with the usual shutter leaves 2, which normally close the aperture 3 in the shutter through which an exposure is made. The aperture 3 is formed by the inner wall of an upstanding tubular member 4 which is usually threaded to take the front element of an objective.

This shutter is of the setting type, although it is to be distinctly understood that our invention is equally applicable to an automatic type of shutter. In the present instance, the shutter includes a master member 5, which is mounted to oscillate upon a post 6 through approximately 180°. The master member is provided with a spring 7 which may be tensioned by moving a lever 8 to turn the master member 5 about its pivot 6 in a known manner. The master member carries a stud 9, to which the lever 10 is pivotally attached, so that a hook 11 may engage an upstanding pin 12 on a blade ring for rocking this lever back and forth to open and close the shutter blades 2 in a known manner.

The shutter is provided with a trigger 13 having an arm 14 adapted to engage a latch element 15 on the master member to hold it in a set position, so that when the trigger is depressed, the arm 14 being moved about the pivotal support 17 removes the arm from the latch member 15, permitting the shutter to function.

When it is desired to operate the shutter after a predetermined time interval—as, for instance, after an elapse of ten seconds—the pretimer which will now be described is operated in the following manner. The pretimer comprises a ring 20 from which an arm 21 extends outwardly through the shutter casing, terminating in a handle 22 which may be used to set the pretimer by moving it in the direction shown by the arrow from the position shown in Fig. 1 to the position shown in Fig. 3. This action through the gear rack 23 and the pinion 24 winds up a spring 25 encircling the shaft 26 so that this spring will be placed under tension, and so that this spring is positioned to drive the ring 20 in the direction shown by the arrow in Fig. 3. There is a gear train designated broadly as 27 and consisting of a series of gears connected to turn with pinion 24 and connected to operate a starwheel 28 which may oscillate a pallet 29 about its pivot 30 to prevent the ring 20 from moving too fast. The number of gears and the strength of the spring 25, of course, controls the speed of operation of the pretimer.

As will appear from Fig. 3, when the handle 22 is moved to its set position shown, a latch element 31 on the ring may be engaged by a latching lever 32, pivotally attached at 33 to the shutter plate 34. A spring 35 tends to turn the latch element in the direction shown by the arrow radially of the shutter and into contact with the ring 20. Thus, the parts are shown in Fig. 3 in their set positions ready to be released by a depression of the trigger member 13 through a lever member 37 pivotally connected at 38 to the trigger and having a downwardly projecting arm 39 provided with an operating end 40 adapted, through engagement with the lug 31, to slide down between the lug and the latch element 32 and move the latch element 32 about its pivot 33, releasing the lug 31. This movement, by separating the latch elements 31 and 32, permits the spring 25 to drive the pretimer ring 20 in a counter-clockwise direction. At the same time, the downward movement of the trigger lever 39 is limited by the lug 61 and the notch 62, as best shown in Fig. 5, so that latch elements 31 and 32 are released.

When this release takes place, the trigger lever 39 is moved by cam 49 to release lug 61 from notch 62, best indicated in Fig. 5, and the cam hook 46 pulls on lever 39 as lug 61 rides up the cam 63 actuating the shutter and slipping off the cam hook 46. There is an upstanding lug 45 which projects into the path of a hook 46, carried by the ring 20, and there is an oppositely disposed lug 47 which forms a support for a spring 48 which always tends to thrust the lever 39 radially toward the center of the shutter. Thus, the lug 61 carried by lever 39 and the lug 45 always tend to move in a counter-clockwise direction.

With the present form of our invention, it will be noted that the handle 22 must be moved to its fully set position shown in Fig. 3 before the latch elements 31 and 32 become engaged to hold it in a position of rest. Thus, the operator is assured of the full time of ten seconds (or whatever predetermined time may have been selected in designing the pretimer) before the shutter will be actuated.

Our shutter pretimer, like the device shown in U. S. Patent 2,090,070, may be equipped with a safety lever 50 provided with a latch element 51 lying in the path of a lug 52, carried by ring 20, so that these cooperating latch elements prevent the handle 22 from being operated to set the pretimer unless the shutter has been set by moving the lever 6 to tension the spring 7. However, this forms no part of our present invention, but is convenient in cases where a setting type of shutter is employed.

It should be noticed from the above description, and it can also be readily seen from Fig. 1, that when the pretimer is in its inoperative position of rest, the operating end 40 of the lever 37, attached to the trigger 13, is positioned by the projection 46, so that the end 40 rides on the outside of the latching element 32 and thus swings downwardly beyond the latch element without operating it, because the latch element rests against an inner flange 60 of the ring 20 and is thus in an inoperative position. However, just as soon as the handle 22 is moved to set the parts, they reach the position shown in Fig. 3, in which the latch element 32 has been moved outwardly so that it will engage the latch element 31 and also so that it will lie in the path of the operating end 40 of the lever 37. Thus, the tripping lever 32 for the pretimer is normally in an inoperative position but moves to an operative position as soon as the pretimer is set. This greatly reduces the amount of wear and the number of operations which the tripping lever 32 would otherwise have to make and at the same time it permits the trigger 13 to operate freely without moving unnecessary parts when the shutter is to be operated in a normal manner.

What we claim is:

1. In a photographic shutter, the combination with shutter mechanism including a master member, shutter blades, operable connections between the blades and master member, of a trigger for releasing the master member for making an exposure, a lever attached to the trigger and normally spring-pressed radially of the shutter, a pretimer mechanism including a retarded and spring-driven member against which the lever is spring pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, and cooperating parts on the spring-driven member and trigger lever for guiding the lever into or out of tripping engagement with the latch according to the relative position of the parts.

2. In a photographic shutter, the combination with shutter mechanism including a master member, shutter blades, operable connections between the blades and master member, of a trigger for releasing the master member for making an exposure, a lever attached to the trigger and normally spring pressed radially of the shutter, a pretimer mechanism including a retarded and spring-driven member against which the lever is spring-pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, a lug on the spring-driven member positioned to engage and normally hold the latch element carried by the lever attached to the trigger out of engagement with the latch for the spring-driven member, whereby the shutter may be normally operated without moving said latch.

3. In a photographic shutter, the combination with shutter mechanism including a master member, shutter blades, operable connections between the blades and master member, of a trigger for releasing the master member for making an exposure, a lever attached to the trigger and normally spring pressed radially of the shutter, a pretimer mechanism including a retarded and spring-driven member against which the lever is spring pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, a lug on the spring-driven member positioned to engage and normally hold the latch element carried by the lever attached to the trigger out of engagement with the latch for the spring-driven member, said lug being movable with the spring-driven member to expose the said latch to operation by the lever attached to the trigger.

4. In a photographic shutter, the combination with shutter mechanism including a master member, shutter blades, operable connections between the blades and master member, of a trigger for releasing the master member for making an exposure, a lever attached to the trigger and normally spring pressed radially of the shutter, a pretimer mechanism including a retarded and spring-driven member against which the lever is spring pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, a lug on the spring-driven member positioned to engage and normally hold the latch element carried by the lever attached to the trigger out of engagement with the latch for the spring-driven member, said lug being movable with the spring-driven member to expose the said latch to operation by the lever attached to the trigger, the shape of the latch elements on the spring-driven element and on the shutter casing limiting the movement of the trigger when said latch is exposed.

5. In a photographic shutter, the combination with shutter mechanism including a master member, shutter blades, operable connections between the blades and master member, of a trigger for releasing the master member for making an exposure, a lever attached to the trigger and normally spring pressed radially of the shutter, a pretimer mechanism including a retarded and spring-driven member against which the lever is spring pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, a lug on the spring-driven member positioned to engage and normally hold the latch element carried by the lever attached to the trigger out of engagement with the latch for the spring-driven member, said lug being movable with the spring-driven member to expose the said latch to operation by the lever attached to the trigger, the lug being also positioned to engage and move the lever attached to the trigger for moving the trigger to release the shutter.

6. In a photographic shutter, the combination with a shutter mechanism including a master member, shutter blades, operable connections between the blades and master member, of a trigger for releasing the master member for making an exposure, a lever attached to the trigger and normally spring-pressed radially of the shutter, a pretimer mechanism including a retarded and spring-driven member against which the lever is spring pressed, a hook on said spring-driven member for engaging and moving the lever to trip the shutter, a latch element carried by the shutter, a latch on the spring-driven member for engaging said latch element for holding the spring-driven member in a tensioned position, a handle for setting the spring-driven member to tension the spring, and means carried by the spring-driven member for positioning said latch element carried by the shutter into an exposed latching position, in which it may be operated by the lever carried by the shutter trigger only when the spring-driven member is positioned to tension its driving spring.

GEORGE E. AULENBACHER.
LAWRENCE R. MARTIN.